(12) United States Patent
Novel

(10) Patent No.: US 8,120,221 B2
(45) Date of Patent: Feb. 21, 2012

(54) POWER GENERATION AND CONVERSION PLATFORM

(76) Inventor: Gordon D. Novel, Santa Ana, CA (US)

( * ) Notice: Subject to any disclaimer, the term of this patent is extended or adjusted under 35 U.S.C. 154(b) by 143 days.

(21) Appl. No.: 12/457,711

(22) Filed: Jun. 18, 2009

(65) Prior Publication Data

US 2010/0019594 A1     Jan. 28, 2010

Related U.S. Application Data

(60) Provisional application No. 61/129,324, filed on Jun. 18, 2008.

(51) Int. Cl.
*H02K 47/14*     (2006.01)
*H02K 53/00*     (2006.01)

(52) U.S. Cl. ............... 310/113; 310/68 R; 310/75 D; 310/75 R; 310/112; 290/1 R

(58) Field of Classification Search ................ 310/75 D, 310/75 R, 103, 112, 114, 68 R; 290/1 C, 290/1 R; 415/916
See application file for complete search history.

(56) References Cited

U.S. PATENT DOCUMENTS

| | | | |
|---|---|---|---|
| 6,930,421 B2* | 8/2005 | Wise | 310/103 |
| 2008/0061560 A1* | 3/2008 | Peacock | 290/1 R |

* cited by examiner

*Primary Examiner* — Tran Nguyen

(57) ABSTRACT

A power generation and conversion platform where power can be readily generated and converted from one form to another is disclosed. The system includes a central column having a plurality of components. These components include an electric motor, a power source for driving the motor, a flywheel coupled to the motor, a torque converter coupled to the flywheel, an electric generator that is driven by the flywheel and a number of electrical capacitors which are cyclically charged by the electric generator and discharged in the manner of a Marx generator.

9 Claims, 3 Drawing Sheets

POWER GENERATION AND CONVERSION PLATFORM

CROSS REFERENCE TO RELATED APPLICATION

This application claims priority to U.S. Patent Application Ser. No. 61/129,324 filed Jun. 18, 2008 and entitled "Power Generation And Conversion Platform"

TECHNICAL FIELD

The present invention generally relates to the field of energy and more particularly, is directed to a power generation and conversion platform where power can be readily generated and converted from one form to another.

BACKGROUND OF THE INVENTION

The adverse effects of global warming are well documented and lead many to conclude that the use of fossil fuels as a primary source of energy must be abated if not altogether eliminated. In recent years a great deal of attention has been devoted to mitigating the causes of global warming thought the development of alternative and/or less polluting sources of energy. Clean coal, biofuels, natural gas, nuclear power, solar and wind all have advantages, but suffer disadvantages as well.

With the continuing growth of the World's population, the demand for affordable, clean, safe and people friendly sources of energy will become one of the most important challenges facing mankind. While the various alternative sources of energy being developed today show promise, none are expected to fully meet mankind's future needs for energy.

Thus, there is a need in the art for an alternative energy source that will meet mankind's future energy needs. The present invention provides such an energy source.

SUMMARY OF THE PRESENT INVENTION

The power generation and conversion platform of the present invention is designed to be modular in construction, thus allowing various components of the platform to be easily replaced for purposes of analysis, testing and maintenance, Modular construction also allows components of the platform to be individually developed for use in conjunction with the other components of the platform or for use by themselves, as the occasion and need arises.

Many of the components and sub-systems of the power generation and conversion platform of the present invention replies on the principles and physics of magnetic fields. Michael Faraday, an English chemist and physicist, is considered by many to be the father of modem electric power generation.

Faraday's work with magnetic fields, and the principles that he discovered, established the basis for magnetic field concepts in physics and led to development of the first motors, generators and transformers. While many others have expanded on his work, Faraday remains the founding source of much of what is known today about magnetic field properties with respect to power generation.

One of Faraday's early discoveries was the homopolar generator. An example of such a generator is depicted in FIG. I. As shown in FIG. I, the generator includes a conducting disk or flywheel 12 that is accelerated to a high rate of speed along its axis. As known in the art, disk 12 may be made from copper to form a copper disk or may be made from a plurality of radial conductors in the form of a spoke and wheel. A number of ways to form disk 12 will be apparent to the skilled artisan.

An external magnetic field is then applied which has the affect of creating a voltage potential across spinning disk 12. In FIG. 1, the magnetic field is applied by permanent magnet 15. Magnet 15 forms a magnetic flux path 14 and generates magnetic flux Φ. However a field coil encircling disk 12 and connected to an external current supply can be used to also provide the field excitation passing through the disk as one of ordinary skill in the art would know how to do.

The rotation of disk 12 through flux path 14 induces a voltage potential between center 16 of the disk and its circumference 18. The electrical energy can be removed via brushes 20 and 22 as illustrated in FIG. I and as would be known to a person of ordinary skill in the art.

A voltage potential also will be generated if disk 12 remains stationary and magnetic flux path 14 is rotated around disk 12.

In comparison with other generators, a homopolar generator can be used to generate extremely high currents. The generated currents are often on the order of 10 to 10,000 amperes at low potential differences. This type of current/voltage profile can be used in such applications as electric welders and railguns.

Homopoloar generators typically operate in pulse mode. When disk 12 has reached operating speed and the external magnetic field is applied, which can be easily be done in the case of a field coil, a load is then applied. As current begins to flow through disk 12 and the load, Lorenz forces quickly decelerate disk 12. As is know in the art, the Lorenze force is a force on a point charge due to electromagnetic fields. Thus, the kinetic energy stored in the disk is converted to a single electrical current pulse. The pulse length can vary depending on the characteristics of the load and typically is between 0.5 to 3.0 seconds in duration.

While homopolar generators usually are operated in pulse mode, these types of generators may also find application in continuous duty, low voltage, high current generators or as low speed, high torque motors.

Thus, an extremely high current of short duration pulses may be obtained after using a relatively low power conventional prime mover or a conventional low voltage, low amperage power source to store inertial energy in disk 12 by gradually accelerating the disk up to the desired rotational speed.

The Marx generator is another generator that is well known in the art. This generator is a type of electric circuit that is used to generate high-voltage pulses for a number of applications, including generation of x-rays and radar pulses.

FIG. 2 illustrates one example of a Marx generator circuit. As shown in FIG. 2, a number of capacitors C are charged in parallel to a given voltage V during a charge phase. The size of voltage V is dependent on the number of capacitor stages. The capacitors are then connected in series by spark gap switches during a discharge phase.

The above and other methods of generating and converting power are provided by the present inventions in new and novel ways. The novel features of the present invention are set out with particularity in the following detailed description of the preferred embodiment. However, the invention will be understood more fully and clearly from the detailed description of the invention as set forth in the accompanying drawings in which:

DESCRIPTION OF THE PREFERRED EMBODIMENT

Figure 1:
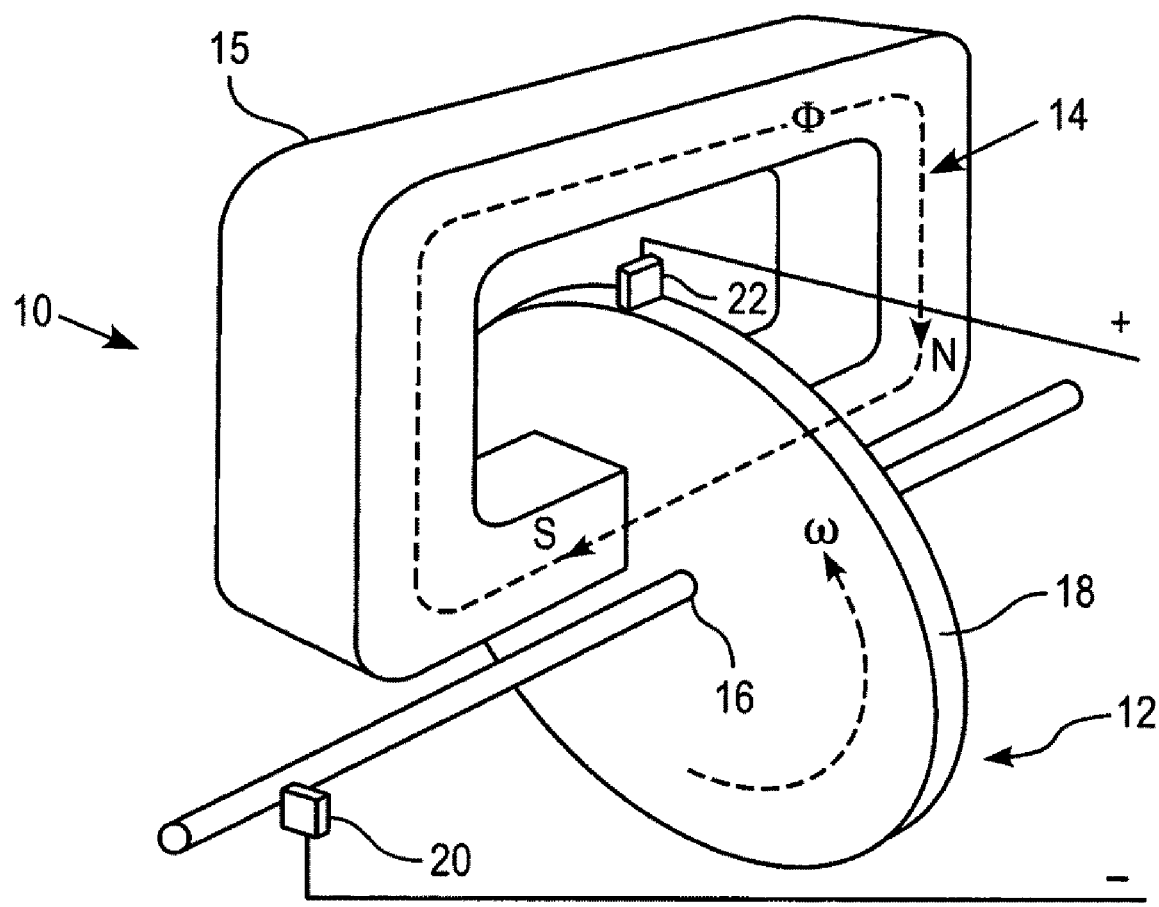
FIG. 1 is an elevation view of a homopolar generator as known in the prior art.
Figure 2:
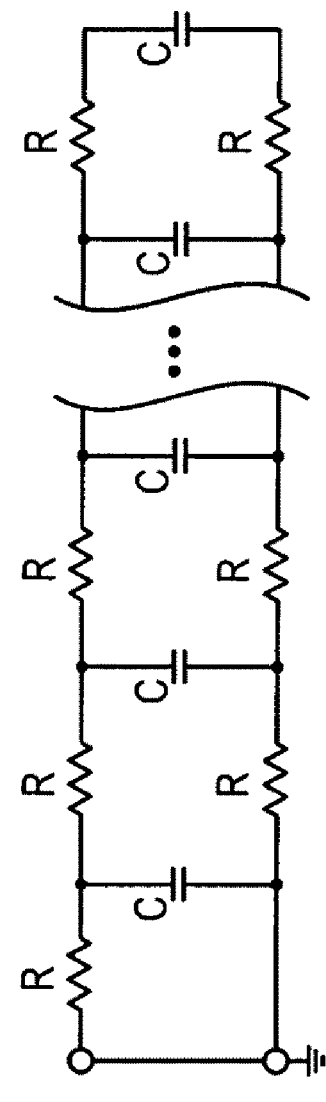
FIG. 2 is a circuit diagram of a Marx generator as known in the art.
Figure 2:
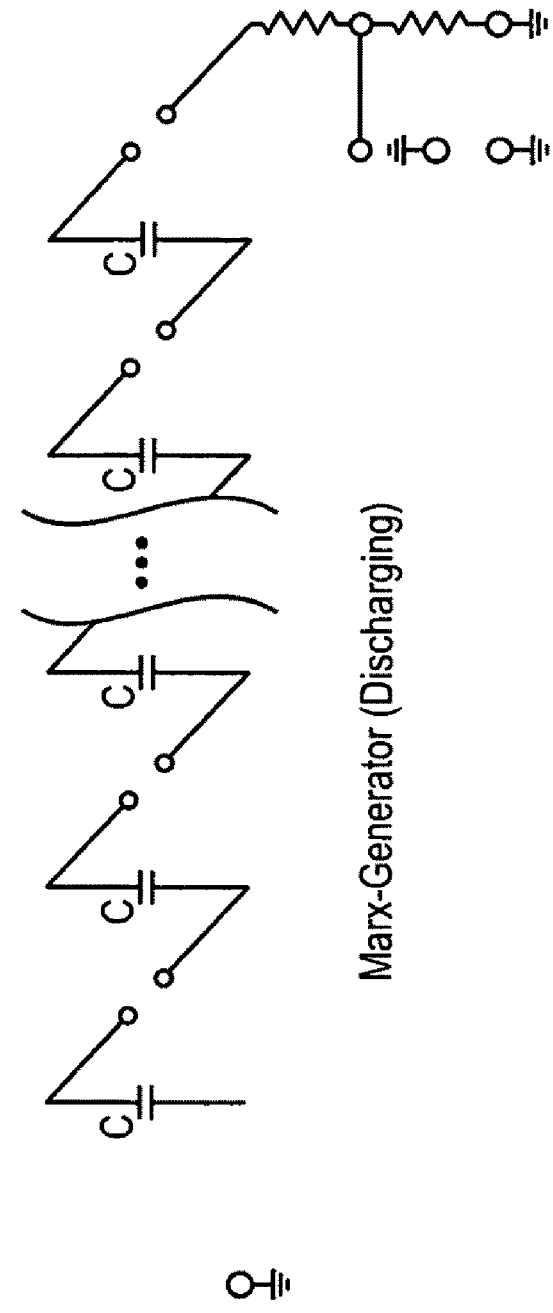
Figure 3:
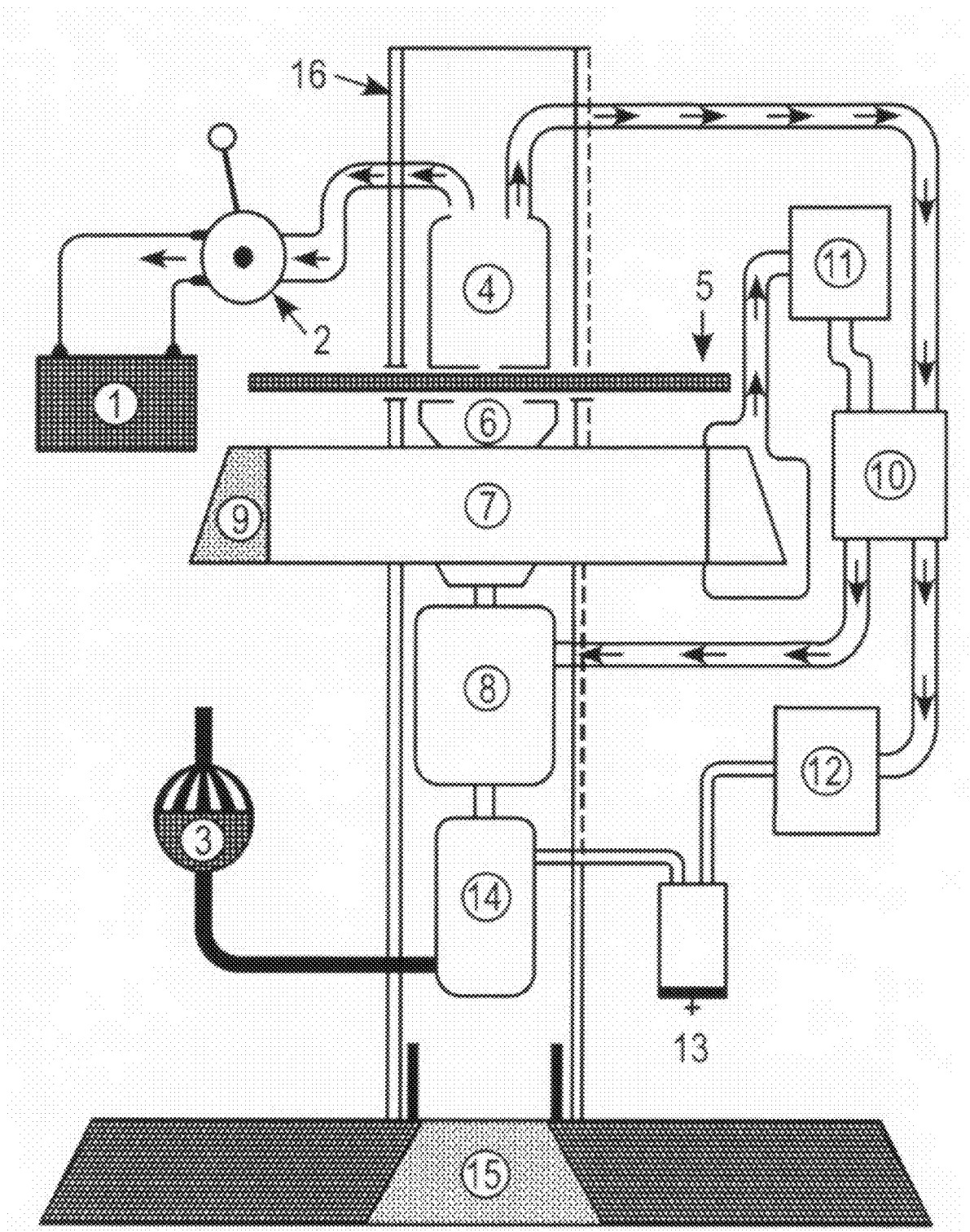
FIG. 3 is an elevation view of one embodiment of the power generation and conversion platform in accordance with the present invention.

A preferred embodiment of the present invention will be described with reference to the accompanying drawings in which FIG. 3 is an elevation view of the power generation and conversion platform of the present invention.

The power generation and conversion platform of the present invention includes a central column 16 within which a number of the components of the invention reside. Central column 16 performs the functions of an amplifier which amplifies a relatively small input level to an extremely large output level.

In accordance with one embodiment of the present invention, column 16 may be formed of a multi-wall structure having an outer wall of steel and an inner wall of aluminum. Such a structure will carry off the initial heat generated by the internal components during the initial stages of operation and charge-up of the system. Once the system has reached its normal operating state, the heat exchange function of Column 16 typically will not be needed any longer.

Column 16 also serves to shield other components that are outside of Column 16 from the harmful effects of the electromagnetic fields that are generated inside the column. To this end, Column 16 may also include an intermediate tube between the outer steel and inner aluminum made of a mu-metal material to provide appropriate shielding. To the extent necessary, Column 16 also provides a vacuum environment for the various components that it contains.

Column 16 includes a 300 HP, 0-20,000 rpm DC series electric motor 4 which spins a disk-like Flywheel 5 at a high rate of speed. Motor 4 is powered by External Battery 1 and its speed is controlled by External Controller 2.

The purposes of Flywheel 5 are to:

A) Accelerate the working electrons in Main Order Coil 9 using imbedded cobalt-type permanent magnets fixed into the outer rim to superluminal velocities as gravitational nullification state change begins to occur. This, in turn, will raise the Gaussian strength level in the field.

B) Function as a gyroscopic stabilizer to dampen the wobble oscillations and otherwise stabilize the platform as there are a number fast moving parts within column 16.

Flywheel 5 is coupled to Torque Converter 6 and Automatic Power Glide type Transmission 7.

Main Order Coil (MOC) 9 is positioned around Transmission 7 and is formed of one continuous loop of a plurality of turns of malleable ¼"×⅝" (0.25 inch) square copper rod material. The field generated by the coil may be AC or DC, depending on the application for the energy generation and conversion platform.

The coil winding commences at the most upper inner turn and proceeds downward, back up, and back down until it reaches its lowest outermost turn where it ends. For safety reasons, MOC 9 may be imbedded in a G-10 dielectric material or immersed in a high voltage resistant transformer oil dielectric. The dielectric permittivity of MOC 0 at ¼" (0.25 inches) of G-10 glass is 166,000 keV.

Transmission 7 is coupled to Generator 8. Generator 8 is a 150 HP, 2,000 rpm DC electric generator which products a current flow as indicated by the arrows. As shown in FIG. 3, some of the current is feed back to Motor 4 and High Frequency White Noise Damping Unit 11 for input to MOC 9 through Voltage Divider 10. Damp Unit 11 damps high frequency radiation generated by MOC 9.

Current also is supplied to Low Frequency Non-Coherent Disruptive Damping Unit 12 for input to Flux Drive Master Control Switch Computer 14 through a 30,000 volt DC Amplifier Firing Coil 13.

Master Control Switch 14 is used for cyclically Charging Flux Generator Drive Deck 15 in parallel and discharging in series in the manner of a Marx generator. Switch 3 controls the on/off operation of Master Control Switch 14.

Circular Marx Generator Drive Deck 15 is formed of a plurality of layers, e.g., 4 layers, each layer having a plurality of electrical capacitors, e.g., 48 capacitors. Each layer can be controlled and operated separately, or together as a unit.

The basic building blocks of the power generation and conversion platform of the present invention will allow a number of new and improved technologies to emerge, including:

1) The generation of Very High Voltage in the range of 0 to 3.0 million volts DC by the Blumlien Capacitor array of pie shaped copper capacitors insulated by variable experimental amounts or thicknesses of DuPont G-10 dielectric glass inserted prior to testing between the plates or by the use of Dow Corning dielectric transformer oil.

2) The creation or production of High Voltage by the flywheel in the WILDKAT X-1 system being properly and correctly described as a "homopolar" generator. It may also be configured by using a Wimshurst high voltage generator.

3) The creation or production of Very High Voltage by the MOC or Main Order Coil functioning as the base coil around a Tesla coil series of many thin copper wire windings around the Central Column, 4) The creation or production of essentially Low Voltage (1000 to 2000 VDC) by the vacuum sealed magnetic bearing operated generator and motor combination inside the Central column, 5) The creation or production of X-Rays and or Gamma Rays by the ionization of the atmosphere around the WILDKAT X-1 modular rig system when the voltage of a rotating electrostatic field functioning between 1.0 million EV and 3 million EV from the charge discharge voltage multiplier operation or activation of the Blumlien like pie shaped capacitor array as could be logically achieved permittivity wise by the insertion of thick G-10 segments of G-10 dielectric glass insulation material.

6) The creation or production of bright colorized light from the ionization of the atmosphere around the Marx or Blumlien Very High Voltage capacitor array Marx like VHV generation function.

It should be obvious from the above-discussed embodiment of the present invention that numerous other variations and modifications of the invention are possible, and such will readily occur to those skilled in the art. Accordingly, the scope of this invention is not to be limited to the embodiment disclosed, but is to include any such embodiments as may be encompassed within the scope of the above described preferred embodiment.

I claim:

1. A power generation system, said system comprising:
   a central column having a plurality of components, including,
   an electric motor;
   a power source coupled to said motor for operating said electric motor;
   a flywheel coupled to said electric motor and being adapted to be spun by said electric motor;

a torque converter coupled to said flywheel;

a mechanical transmission coupled to said torque converter;

an electric generator coupled to said mechanical transmission and adapted to be turned by said mechanical transmission to produce electrical power;

a plurality of electrical capacitors coupled to said electric generator; and a control switch coupled to said plurality of electrical capacitors, wherein said control switch enables said plurality of electrical capacitors to be cyclically charged by said electric generator and to be discharged in the manner of a Marx generator.

2. The power generation system of claim 1, wherein said control switch enables said plurality of electrical capacitors to be cyclically charged in parallel by said electric generator.

3. The power generation system of claim 2, wherein said control switch enables said plurality of electrical capacitors to be cyclically discharged in series in the manner of a Marx generator.

4. The power generator system of claim 1, wherein said plurality of electrical capacitors are formed in a plurality of groups, each of said groups having a plurality of said electrical capacitors.

5. The power generator system of claim 4, wherein at least some of said electrical capacitors in said plurality of groups are electrically connected in parallel.

6. The power generator system of claim 5, wherein said chargeing and discharging of said plurality of groups of said electrical capacitors being separately controlled by said control switch.

7. The power generator system of claim 4, wherein at least some of said electrical capacitors in said plurality of groups are electrically connected in series.

8. The power generator system of claim 7, wherein said charging and discharging of said plurality of groups of said electrical capacitors being separately controlled by said control switch.

9. The power generator system of claim 1, wherein said flywheel is adapted to function as a gyroscopic stabilizer to stabilize said components within said central column.

* * * * *